UNITED STATES PATENT OFFICE.

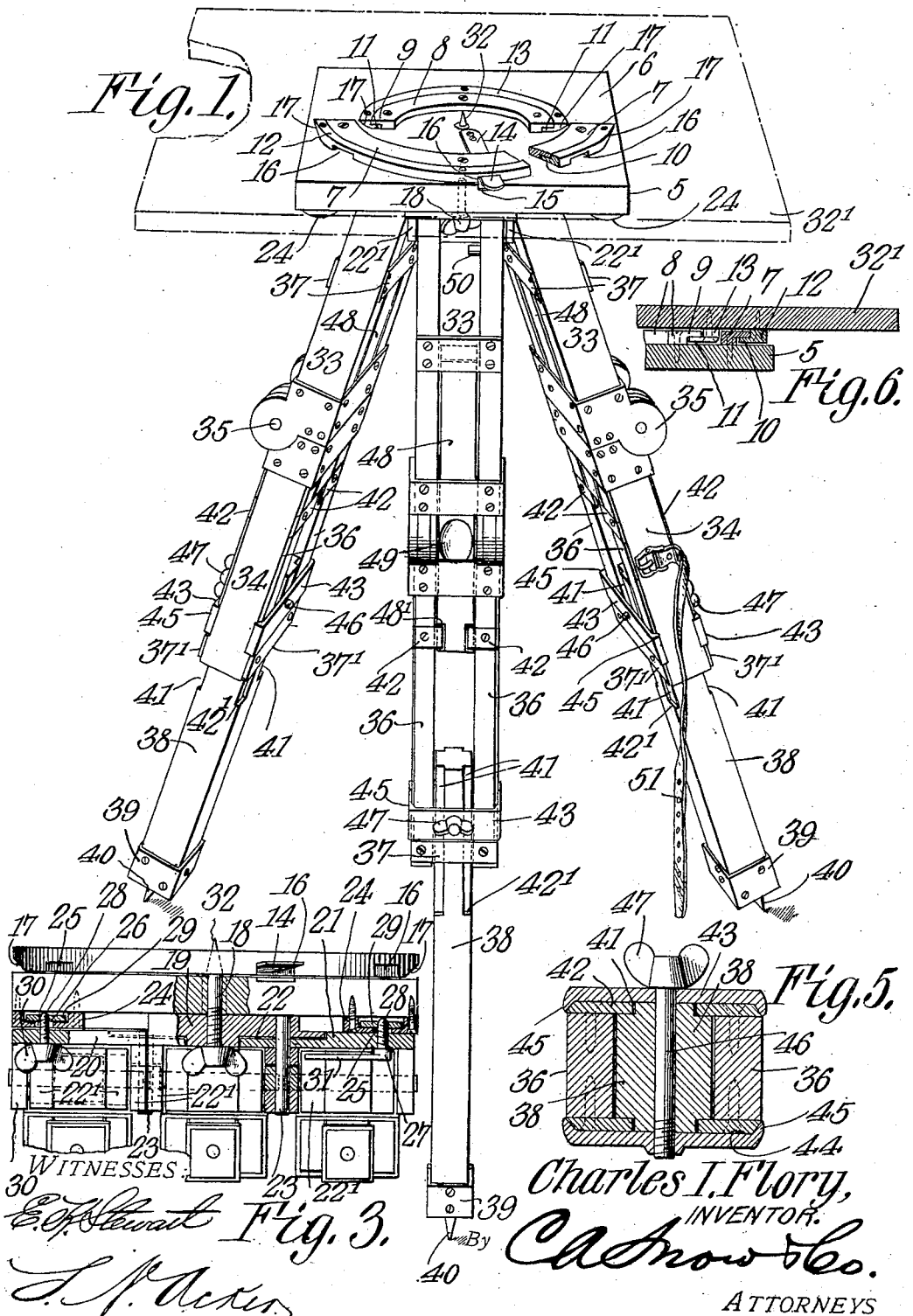

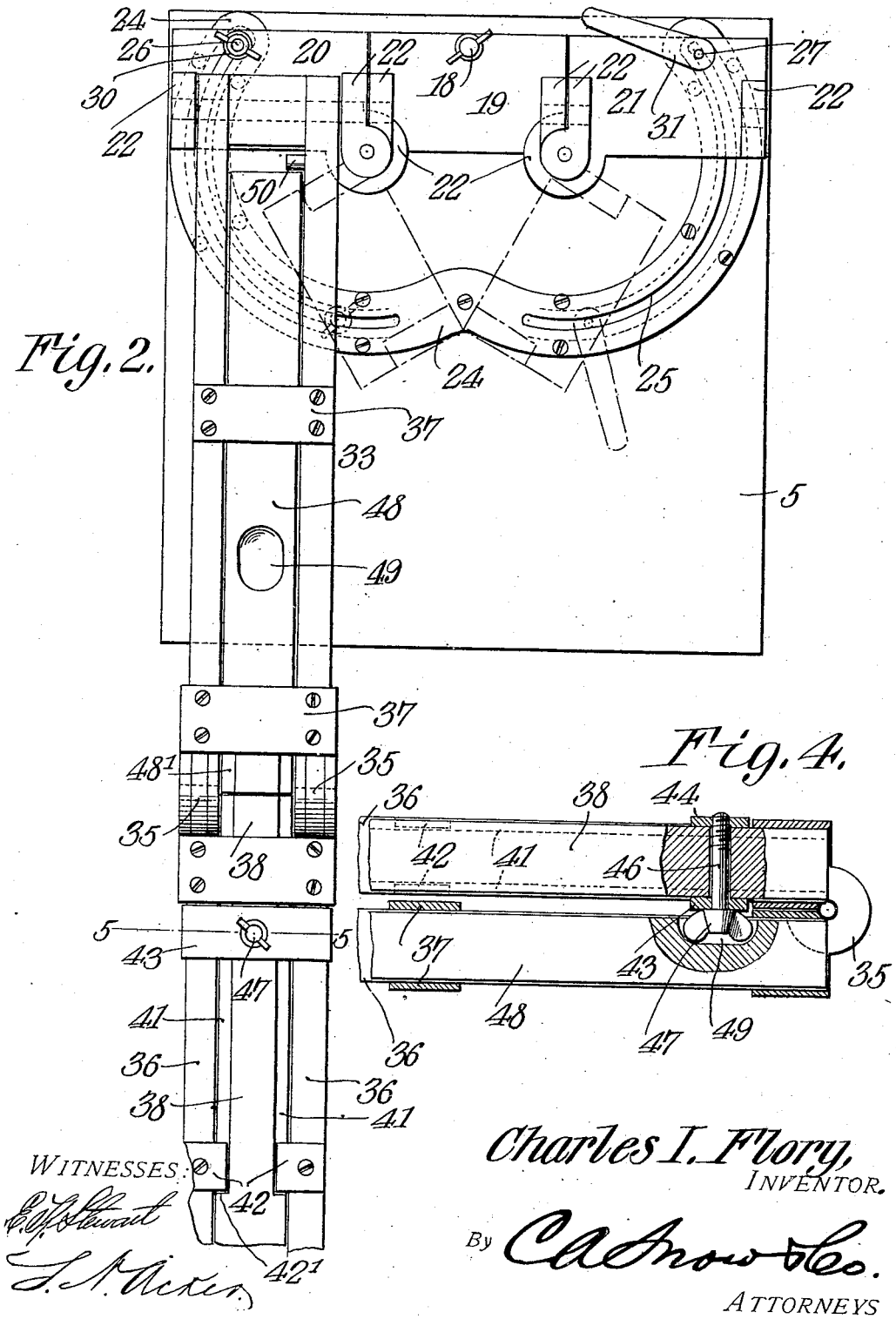

CHARLES I. FLORY, OF PALMYRA, MISSOURI.

TRIPOD AND ATTACHING DEVICE.

No. 873,121.        Specification of Letters Patent.        Patented Dec. 10, 1907.

Application filed February 27, 1907. Serial No. 359,572.

*To all whom it may concern:*

Be it known that I, CHARLES I. FLORY, a citizen of the United States, residing at Palmyra, in the county of Marion and State of Missouri, have invented a new and useful Tripod and Attaching Device, of which the following is a specification.

This invention relates to tripods for cameras and has for its object to effect certain improvements in tripods whereby the supporting legs of the latter may be conveniently lengthened or shortened and compactly folded against the tripod head so that the same may lie flat upon the camera bed and thus occupy very little space.

A further object of the invention is to provide a tripod in which the supporting legs are permanently attached to the tripod head and movable laterally on the same to operative and inoperative position.

A further object is to provide the sectional folding legs of the tripod with a longitudinally movable locking member adapted to bear against the knuckle joint of adjacent sections when the supporting legs are extended and lock said sections in alinement with each other, said locking members being movable to released position when the terminal sections of the legs are retracted so as to permit the legs to be folded laterally in engagement with the tripod head.

A further object is to provide improved means for attaching the camera to the tripod head and means for locking the camera in adjusted position.

A still further object of the invention is to generally improve this class of devices so as to increase their utility, durability and efficiency.

Further objects and advantages will appear in the following description it being understood that various changes in form, proportions and minor details of construction may be resorted to within the scope of the appended claims.

In the accompanying drawings forming a part of this specification: Figure 1 is a perspective view of a tripod constructed in accordance with my invention. Fig. 2 is a bottom plan view of the tripod head showing one of the supporting legs in position thereon and in dotted lines the position assumed by the legs when the tripod is set up for use. Fig. 3 is a side elevation partly in section showing the legs in folded position. Fig. 4 is a side elevation partly in section showing two of the pivoted sections of one of the supporting legs in folded position. Fig. 5 is a transverse sectional view taken on the line 5—5 of Fig. 2. Fig. 6 is a transverse sectional view of the head of the tripod and the adjacent portion of the camera showing the same in locked position.

Similar numerals of reference indicate corresponding parts in all of the figures of the drawings.

The improved device forming the subject matter of the present invention includes a supporting head 5 preferably rectangular in shape, as shown and having its upper flat bearing surface 6 provided with spaced segmental plates 7 and 8 each having a laterally extending flange 9 adapted to engage correspondingly shaped flanges 10 and 11 formed on similar plates 12 and 13 secured to the bottom of the camera, indicated at 32' in Figs. 1 and 6 of the drawings. The large plate 7 is preferably secured to the front of the head 5 while the plate 13 is secured to the rear of the camera so that by reversing the camera and positioning the latter on the head of the tripod with the plate 13 in engagement with the plate 7 and revolving the camera the flanges will interlock and thus prevent accidental displacement of said camera.

Secured in any suitable manner to the upper surface of the head 5 is a spring locking member 14 the free end of which is disposed in alinement with a recess 15 in said head and is adapted to engage any one of a series of locking notches or recesses 16 formed in the lower surface of the segmental plate 12 thereby to lock the camera in adjusted position on the head. The opposite ends of the several segmental plates are preferably inclined or beveled, as indicated at 17 so as to permit said plates to ride over the locking member 14 when adjusting the camera on the tripod head. It will thus be seen that when the camera is rotated on the head the inclined face 17 will engage and depress the locking member 14 and when one of the locking notches or recesses 16 registers with the locking member the latter will enter the recess and thereby prevent further rotary movement of the camera.

As a means for assisting in locking the camera in adjusted position there is provided a clamping screw 18 which extends through the tripod head and bears against the adjacent surface of the segmental plate 12 so that the camera may be locked in adjusted position independently of the member 14.

Secured to the under side or base of the head 5 at one longitudinal edge thereof are a plurality of alined plates 19, 20 and 21, the intermediate plate 19 being rigidly secured to the head 5 while the plates 20 and 21 are pivotally connected therewith by knuckle joints 22 so that the same are free to swing laterally to the dotted line position shown in Fig. 2 of the drawings when the tripod is set up for use. The plates 19, 20 and 21 are provided with spaced ears or lugs 22' between which are pivotally mounted the supporting legs of the tripod, said legs or brackets being pivotally united, as indicated at 23.

Attention is here called to the fact that the pivot pins 23 form a continuation of the pivot pins of the knuckle joint 22 so that the pivotal axis of the knuckles and supporting legs or brackets are concentric and free to move laterally to operative and inoperative position without danger of binding.

Interposed between the plates 20 and 21 and the bottom of the tripod head 5 is a curved guide plate 24 having spaced segmental slots 25 formed therein for the reception of suitable clamping members 26 and 27. The clamping members 26 and 27 are secured to the plates 20 and 21, respectively and are each provided with a threaded shank 28 which extends through the segmental slot 25 for engagement with a clamping nut 29 whereby the movable plates 20 and 21 may be locked in adjusted position. The clamping member 26 is preferably in the form of a screw having terminal wings or finger pieces 30 while the clamping member 27 is provided with an operating handle 31. Either or both forms of clamping device may be used for locking the movable plates in adjusted position, and if desired a pivot pin 32 may be extended upwardly through the head of the tripod for engagement with the camera in the usual manner.

The supporting legs are preferably formed of laterally foldable sections 33 and 34 pivotally united at 35 by a knuckle joint or other suitable hinged connection and formed of spaced longitudinal strips 36 connected by spaced reinforcing straps 37 and 37'.

Slidably mounted between the longitudinal strips 36 forming the lower section 34 of each supporting leg is a sliding leg section 38 having its lower end reinforced and strengthened by a metallic ferrule 39 and provided with a depending spur 40 adapted to enter the ground and prevent slipping of the supporting legs when the tripod is in use. The upper end of each sliding section 38 is rabbeted along its longitudinal edges at 41 for the reception of the inwardly extending retaining plates 42, said rabbeted edges forming shoulders or stops 42' which engage the plates 42 when the supporting legs are folded and thus serve to assist in limiting the longitudinal movement of said sliding section.

The lower hinged section 34 of each supporting leg is provided with spaced clamping bars 43 and 44 having their opposite ends bent to form laterally extending guiding flanges 45 which grip the longitudinal strips 36 and serve to lock the extensible or sliding section 38 in adjusted position, the longitudinal movement of the bars 43 and 44 being limited by engagement with the plates 37'.

The clamping plates 43 are moved to operative and inoperative position by means of a clamping bolt 46, the lower end of which is threaded in a correspondingly threaded opening in the plate 44 while its opposite end passes through the sliding section 38 and an opening in the upper plate 43 and is provided with a terminal finger piece 47 so that by rotating the finger piece the plates are clamped into frictional engagement with the longitudinal strips of the hinged section 34 and the adjacent surface of the movable section 38 thereby to prevent accidental displacement of the sliding leg section.

As a means for locking the laterally movable sections 33 and 34 in alinement with each other when the supporting legs are extended there is provided a longitudinally movable locking member 48 preferably in the form of an elongated block, said block being slidably mounted between the spaced longitudinal strips of the upper pivoted leg section 33 and movable by gravity to a position opposite the knuckle or hinge joint 35 when the sliding leg section 38 is extended.

Formed in one longitudinal face of the locking member or block 48 is a depression or recess 49 adapted to receive the head or finger piece 47 of the clamping member 46 when the leg section 34 is folded upon the section 33 and thus prevent longitudinal movement of both the locking member 48 and the sliding leg section 38.

A lug or projection 50 preferably extends inwardly from one of the longitudinal strips comprising the upper leg section 33, said lug being adapted to limit the longitudinal movement of the locking block or member 48 so that when the block engages said lug the recess or depression 49 will be in position to receive the head of the screw or clamping member 46 when the member 34 is folded on the section 33 in the manner before stated.

Attention is here called to the fact that when the sliding section 38 of each supporting leg is extended the block 48 will drop by gravity to a position at the rear of the hinge joint 35, and when the section 38 is retracted so as to permit the legs to be folded, the upper end of the sliding section 38 will engage the adjacent end of the block 48 and automatically move the same longitudinally of the supporting leg into engagement with the lug 50 and in which position the section 34 is free to be folded laterally on the section 33 and the latter folded upwardly against the head of the tripod. It will also be observed that the head 47 of the clamping screw by engagement with the walls of the depression or socket 49 serves to lock both the member 48 and sliding leg section 38 in folded or collapsed position.

When it is desired to use the tripod the head of the tripod is supported in a horizontal position and the legs allowed to hang vertically from said head, after which the legs are shifted laterally to the dotted line position shown in Fig. 2 of the drawing and the sections 34 folded laterally in alinement with the sections 33. The sliding sections 38 are then adjusted and locked in adjusted position by tightening the clamping member 46, the locking member being movable by gravity at the rear of the hinged joint in the manner before stated.

In order to fold the legs the clamping member 46 is released and the sliding section 38 moved longitudinally between the longitudinal strips 36 of the pivoted section 34 which simultaneously moves the locking member 48 to inoperative position thus permitting the section 34 to be folded on the section 33 and both sections folded laterally on the head 5 to the position in Fig. 3 of the drawings and in which position the tripod may be placed in the camera case or conveniently carried from place to place.

The longitudinal edges of each locking member at the lower end thereof is preferably rabbeted, as indicated at 48', so that when said member is moved to operative position at the adjacent knuckle the rabbeted end of the locking member will fit between and bear against the plate 42 and thus prevent accidental displacement of the same, as best illustrated in Fig. 1 of the drawings. If desired, however, the lower ends of the several locking members may be inclined or tapered so as to fit between the plates 42, the result accomplished being the same in both cases.

If desired one of the supporting legs may be provided with a strap 51 to assist in holding the legs in assembled position.

It will of course be understood that the supporting legs may be formed of any number of sections and that the camera attaching plates instead of being segmental in form may be circular in shape, the result accomplished being the same in both cases.

Having thus described the invention what is claimed is:

1. In a tripod, a head, supporting legs pivotally mounted on the head and formed of pivotally united sections including spaced longitudinal strips, and a gravity actuated locking member slidably mounted between the strips at the pivotal juncture of adjacent leg sections for locking said sections in alinement with each other.

2. In a tripod, a head, supporting legs pivotally mounted on the head and each formed of pivotally connected sections and a sliding section, and gravity actuated means for locking the pivoted sections in alinement with each other, said locking means being movable to released position by engagement with the sliding sections.

3. In a tripod, a head, supporting legs pivotally mounted on the head and each formed of pivotally connected sections and a sliding section, the pivoted sections being formed of longitudinal strips spaced apart for the reception of the sliding section, and a gravity actuated locking member carried by one of the pivoted sections for locking the same in engagement with an adjacent section, said locking means being released by engagement with the sliding section.

4. In a tripod, a head, supporting legs pivotally mounted on the head and each formed of pivotally united sections and a sliding section, a locking member carried by one of the pivoted sections of each leg for locking adjacent sections in alinement with each other, said locking member being movable by gravity to operative position when the sliding section is extended and moved to inoperative position by engagement with the sliding section when said section is moved to retracted position.

5. In a tripod, a head, supporting legs carried by the head and each formed of pivotally united sections and a sliding section, the sliding sections being movable longitudinally of one of the pivoted sections, a locking member movable to operative position at the pivotal connection of adjacent sections, and means carried by the sliding section and adapted to engage the locking member when the pivoted sections are folded.

6. In a tripod, a head, supporting legs pivotally associated with the head and each formed of pivotally united sections and a sliding section, means carried by one of the pivoted sections for locking the sliding section in adjusted position, a locking member movable by gravity to a position at the rear of the pivotal connection between adjacent sections for locking said sections in alinement with each other, said locking member being moved to released position by engagement with the sliding section.

7. In a tripod, a head, supporting legs pivotally associated with the head and each formed of pivotally united sections and a sliding section, a locking member movable to operative position at the juncture of adjacent sections for locking said sections in alinement with each other, a clamping member for supporting the sliding member in adjusted position, said clamping member and locking member being provided with interlocking parts.

8. In a tripod, a head provided with means for engagement with a camera, supporting legs pivotally connected with the head and each formed of pivotally united sections and a sliding section, and gravity actuated locking members for locking the pivoted sections in alinement with each other, said locking members being movable to released position by engagement with the sliding sections.

9. In a tripod, a head, supporting legs pivotally mounted on the head and each formed of pivotally united sections and a sliding section, means for locking the pivoted sections in alinement with each other, and means for clamping the sliding section in adjusted position, said locking and clamping members being provided with interengaging parts.

10. In a tripod, a head, supporting legs carried by the head and each formed of pivotally united sections and a sliding section, a clamp for holding the sliding section in adjusted position, a locking member slidably mounted on one of the pivoted sections of each leg and movable to operative position at the pivotal juncture of adjacent sections, an inwardly extending lug carried by one of the sections and adapted to engage the locking member for limiting the longitudinal movement of said member in one direction, said locking member being provided with a depression for the reception of the clamp when the pivoted sections are folded thereby to limit the longitudinal movement of the locking member in the opposite direction.

11. In a tripod, a head, supporting legs pivotally mounted on the head and each consisting of pivotally united sections and a sliding section, a clamping member for locking the sliding member in adjusted position, a longitudinally movable locking block movable to operative position at the pivotal juncture of the pivoted sections for locking said sections in alinement with each other, there being a depression formed in the block and adapted to receive the clamping member when the pivoted sections are folded.

12. In a tripod, a head, a stationary bracket secured to the head, terminal brackets pivotally connected with the stationary bracket and normally disposed in alinement with each other, supporting legs pivotally connected with the brackets, a guide plate secured to the head and having a segmental slot formed therein, and clamping members carried by the terminal brackets and engaging the segmental slots in the plate for locking the brackets in adjusted position.

13. In a tripod, a head, a stationary plate secured to the head, terminal plates pivotally connected with the stationary plate, brackets carried by the stationary and pivoted plates and pivotally connected with each other, the pivotal connection between the plates and brackets being continuous, and supporting legs pivotally connected with the brackets.

14. In a tripod, a head, an intermediate stationary plate secured to the head, terminal plates pivotally connected therewith and movable laterally over the lower surface of the head to operative and inoperative position, brackets carried by the plates and pivotally connected with each other, the pivot pins of the brackets forming a pivotal connection between the plates, supporting legs pivotally connected with the brackets, and means for locking the terminal brackets in adjusted position.

15. The combination with a tripod head, of a camera base mounted for rotation on said head, segmental plates carried by the tripod head and camera, respectively, and provided with interengaging laterally extending flanges, one of said flanges being provided with a recess, and a locking member adapted to enter said recess for locking the camera base at any desired rotary adjustment.

In testimony that I claim the foregoing as my own, I have hereto affixed my signature in the presence of two witnesses.

CHARLES I. FLORY.

Witnesses:
J. S. FRAZIER,
W. W. GILKINSON.